(12) United States Patent
Wang et al.

(10) Patent No.: US 11,385,109 B2
(45) Date of Patent: Jul. 12, 2022

(54) PRESSURE DETECTING CIRCUIT AND METHOD, DISPLAY PANEL, AND DISPLAY APPARATUS

(71) Applicant: BOE TECHNOLOGY GROUP CO., LTD., Beijing (CN)

(72) Inventors: Pengpeng Wang, Beijing (CN); Xiaoliang Ding, Beijing (CN); Chih-Jen Cheng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 576 days.

(21) Appl. No.: 16/346,200

(22) PCT Filed: Dec. 12, 2018

(86) PCT No.: PCT/CN2018/120521
§ 371 (c)(1),
(2) Date: Apr. 30, 2019

(87) PCT Pub. No.: WO2019/148974
PCT Pub. Date: Aug. 8, 2019

(65) Prior Publication Data
US 2021/0356337 A1    Nov. 18, 2021

(30) Foreign Application Priority Data
Jan. 31, 2018    (CN) .......................... 201810095179.1

(51) Int. Cl.
*G01L 1/00* (2006.01)
*G01L 1/18* (2006.01)
*G01L 1/22* (2006.01)

(52) U.S. Cl.
CPC .............. *G01L 1/183* (2013.01); *G01L 1/225* (2013.01)

(58) Field of Classification Search
CPC ................................ G01L 1/183; G01L 1/225
See application file for complete search history.

(56) References Cited

U.S. PATENT DOCUMENTS 4,550,611 A * 11/1985 Czarnocki ............... G01L 9/125
                                                              73/708
10,244,954 B2 * 4/2019 Seaver ................... A61B 5/031
(Continued)

FOREIGN PATENT DOCUMENTS

CN    1678891 A    10/2005
CN    200950090 Y    9/2007
(Continued)

OTHER PUBLICATIONS

International Search Report dated Feb. 27, 2019, issued in counterpart application No. PCT/CN2018/120521. (12 pages).
(Continued)

*Primary Examiner* — Max H Noori
(74) *Attorney, Agent, or Firm* — WHDA, LLP

(57) ABSTRACT

A pressure detecting circuit may include a pressure sensing circuit (101), a signal generating circuit (102), and a frequency detecting circuit (103). The pressure sensing circuit (101) and the signal generating circuit (102) may be configured to constitute an oscillating circuit (104). The signal generating circuit (102) may be configured to generate an oscillating signal based on a pressure sensed by the pressure sensing circuit (101). The frequency detecting circuit (103) may be configured to detect a frequency of the oscillating signal and determine a value of the pressure sensed by the pressure sensing circuit (101) based on the frequency of the oscillating signal.

15 Claims, 13 Drawing Sheets

(56) References Cited

U.S. PATENT DOCUMENTS

| | | | | |
|---|---|---|---|---|
| 2005/0005701 A1* | 1/2005 | Cheng | ................... | G01L 9/02 |
| | | | | 73/708 |
| 2005/0284231 A1 | 12/2005 | Zimmerman et al. | | |
| 2015/0091856 A1* | 4/2015 | Park | ................ | G06F 3/04166 |
| | | | | 345/174 |
| 2019/0011316 A1 | 1/2019 | Klemm | | |

FOREIGN PATENT DOCUMENTS

| | | | |
|---|---|---|---|
| CN | 101078659 | A | 11/2007 |
| CN | 206499551 | U | 9/2017 |
| CN | 107873081 | A | 4/2018 |
| CN | 108287033 | A | 7/2018 |
| EP | 1 532 429 | B1 | 11/2011 |
| WO | 2016/053631 | A1 | 4/2016 |

OTHER PUBLICATIONS

Office Action dated Mar. 22, 2019, issued in counterpart CN application No. 201810095179.1, with English translation. (12 pages).

Office Action dated Sep. 30, 2019, issued in counterpart CN application No. 201810095179.1, with English translation. (7 pages).

\* cited by examiner

PRESSURE DETECTING CIRCUIT AND METHOD, DISPLAY PANEL, AND DISPLAY APPARATUS

CROSS-REFERENCE TO RELATED APPLICATIONS

This application claims benefit of the filing date of Chinese Patent Application No. 201810095179.1 filed on Jan. 31, 2018, the disclosure of which is hereby incorporated in its entirety by reference.

TECHNICAL FIELD

The present disclosure relates to display technology, and in particular, to a pressure detecting circuit, a pressure detecting method, a display panel, and a display apparatus.

BACKGROUND

An active piezoresistive detection circuit or a passive piezoresistive detection circuit is currently used to detect resistance of a piezoresistive sensor, that is, piezo-resistance. FIG. 1 is a schematic diagram of a passive piezoresistive detection circuit in the related art. As shown in FIG. 1, the passive piezoresistive detection circuit is composed of a piezoresistive sensor PR', a thin film transistor (TFT) SEL', and a resistive voltage amplifier.

However, the piezoresistive detection circuits in the related art have the following shortcomings: first, the piezo-resistance is detected after being coupled to an amplifier in a normally open state. Therefore, current leakage often occurs. Taking FIG. 1 as an example, the leaked current could have a value of NXVB'/RX', where RX' is a resistance of the piezoresistive sensor PR', VB' is a preset voltage, N is the number of columns of the piezoresistive sensor PR' array. Furthermore, the on-state resistance of the thin film transistor TFT is so large that change of the current signal is too small, thereby leading to a large detection error. Second, the active piezoresistive detection circuit consumes a large amount of current.

BRIEF SUMMARY

One example of the present disclosure provides a pressure detecting circuit. The pressure detecting circuit may include a pressure sensing circuit; a signal generating circuit; and a frequency detecting circuit. The pressure sensing circuit and the signal generating circuit may be configured to constitute an oscillating circuit; the signal generating circuit may be configured to generate an oscillating signal based on a pressure sensed by the pressure sensing circuit; and the frequency detecting circuit may be configured to detect a frequency of the oscillating signal and determine a value of the pressure sensed by the pressure sensing circuit based on the frequency of the oscillating signal.

Optionally, the signal generating circuit comprises comparing circuit, a first input terminal of the comparing circuit being coupled to a first terminal of the pressure sensing circuit, and an output terminal of the comparing circuit being coupled to a second terminal of the pressure sensing circuit; and a feedback circuit, a first terminal of the feedback circuit being coupled to a second input terminal of the comparison circuit, and a second terminal of the feedback circuit being coupled to the output terminal of the comparing circuit. The comparing circuit is configured to generate the oscillating signal by comparing a voltage of the first terminal of the pressure sensing circuit with a voltage of the first terminal of the feedback circuit, and outputs the oscillating signal through the output terminal of the comparing circuit.

Optionally, the pressure sensing circuit comprises M pressure sensing subcircuits, each of the M pressure sensing subcircuits comprising a pressure sensitive component, a first transistor, and a first capacitor, where M is a positive integer. A first terminal of each of the M pressure sensing subcircuits is coupled to the first input terminal of the comparing circuit, a second terminal of each of the M pressure sensing subcircuits is coupled to the output terminal of the comparing circuit, and each of the M pressure sensing circuits is configured to participate in oscillation of the oscillating circuit when the corresponding first transistor is turned on.

Optionally, the pressure detecting circuit comprises M scanning signal lines, and a gate of the first transistor of each of the M pressure sensing subcircuits is respectively coupled to one of the M scanning signal lines, and each of the scanning signal lines is configured to control whether a pressure sensing subcircuit participates in oscillation or not by controlling opening or closing of the first transistor of the pressure sensing subcircuit.

Optionally, one terminal of the first capacitor is grounded, the other terminal of the first capacitor is coupled to one terminal of the pressure sensitive component, a first node is between the first capacitor and the pressure sensitive component, the other terminal of the pressure sensitive component is coupled to the output terminal of the comparing circuit, the first terminal of the first transistor is coupled to the first node, and the second terminal of the first transistor is coupled to the first input terminal of the comparing circuit.

Optionally, the feedback circuit comprises a first resistor and a second resistor, and one terminal of the first resistor is coupled to the output terminal of the comparing circuit, the other terminal of the first resistor is coupled to one terminal of the second resistor, a second node is disposed between the first resistor and the second resistor and coupled to the second input terminal of the comparing circuit, and the other terminal of the second resistor is grounded.

Optionally, the signal generating circuit further comprises a voltage stabilizing diode, one terminal of the voltage stabilizing diode is coupled to the output terminal of the comparing circuit and the other terminal of the voltage stabilizing diode is grounded.

Optionally, the comparing circuit is a comparator or an operational amplifier.

Optionally, the frequency detecting circuit comprises a shaper, a monostable flip-flop, an RS flip-flop, a counter, and a latch. The shaper is configured to shape the oscillating signal to generate and output a shaped oscillating signal. The monostable flip-flop is configured to convert the shaped oscillating signal to a pulse signal. The RS flip-flop is configured to generate a trigger signal based on the pulse signal. The counter is configured to count under control of the trigger signal to record a number of count pulses between two adjacent pulse signals. The latch is configured to latch the number of count pulses between the two adjacent pulse signals.

Optionally, the oscillating signal is a square wave signal.

Optionally, the M pressure sensing subcircuits are in a same column.

Optionally, the pressure sensitive component is a varistor.

One example of the present disclosure is a display panel. The display panel may include N pressure detecting circuits according to one embodiment of the present disclosure. N is a positive integer.

Optionally, the display panel comprises a pressure sensing array comprising M rows and N columns of the pressure sensing subcircuits of the N pressure detecting circuits, wherein gates of first transistors of N pressure sensing subcircuits in a same row are coupled to a same scanning signal line, and the first transistors in the M rows of the pressure sensing subcircuits are turned on row by row.

Optionally, the display panel further comprises a pixel array comprising M rows and N columns of pixel units, wherein the M rows and N columns of pixel units are respectively disposed corresponding to the M rows and N columns of the pressure sensing subcircuits, and each of pressure sensing subcircuits is arranged in an interval between two of the pixel units.

One example of the present disclosure is a display apparatus comprising the display panel according to one embodiment of the present disclosure.

One example of the present disclosure is a pressure detecting method. The pressure detecting method comprise constructing an oscillating circuit comprising a signal generating circuit and a pressure sensing circuit, wherein the signal generating circuit is configured to generate an oscillating signal based on a pressure sensed by the pressure sensing circuit; detecting a frequency of the oscillating signal; and determining a valued of the pressure sensed by the pressure sensing circuit based on the frequency of the oscillating signal.

DETAILED DESCRIPTION

Figure 1:
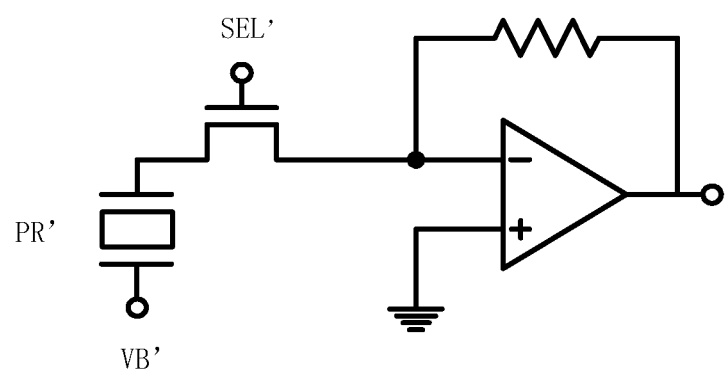
FIG. 1 is a schematic diagram of a passive piezoresistive detection circuit in the related art.

The present disclosure will be explained in further detail with reference to the accompanying drawings and embodiments in order to provide a better understanding by those skilled in the art of the technical solutions of the present disclosure. Throughout the description of the disclosure, reference is made to FIGS. 1-13. When referring to the figures, like structures and elements shown throughout are indicated with like reference numerals.

In the description of the present disclosure, it is to be understood that the terms "center," "longitudinal," "transverse," "length," "width," "thickness," "upper," "lower," "front," "back," "left," "right," "vertical," "horizontal," "top," "bottom," "inside," "outside," "clockwise," "counterclockwise," "axial," "radial," "circumferential," and the like are based on the orientation or positional relationship shown in the drawings, and are merely for the convenience of the description of the disclosure and the simplified description, rather than indicating or implying that the apparatus or component referred to must be constructed and operated in a particular orientation, and are not to be construed as limiting the disclosure.

Moreover, the terms "first" and "second" are used for descriptive purposes only and are not to be construed as indicating or implying a relative importance or implicitly indicating the number of technical features indicated. Thus, features defining "first" or "second" may include at least one of the features, either explicitly or implicitly. In the description of the present disclosure, the meaning of "a plurality" is at least two, such as two, three, etc., unless specifically defined otherwise.

In the present disclosure, unless otherwise explicitly defined, the terms "installation," "coupled to," "connected," "fixed" and the like shall be understood broadly. For example, it may be either a fixed connection or a detachable connection or integrated; can be mechanical or electrical connection; can be directly coupled, or indirectly coupled through an intermediate medium, can be the internal communication of two components or the interaction of two components, unless otherwise specifically limited. The specific meanings of the above terms in the present disclosure can be understood by those skilled in the art on a case-by-case basis.

In the present disclosure, the first feature "on" or "below" in the second feature may be the direct contact of the first and second features, or the first and second features are indirectly coupled through the intermediate medium, unless otherwise explicitly stated and defined. Moreover, the first feature "above" or "on" the second feature may be that the first feature is directly above or to the inclined top of the second feature, or merely that the first feature level is higher than the second feature. The first feature "below" or "under" the second feature may be that the first feature is directly below or below the second feature, or merely that the level of the first feature is less than that of the second feature.

In the description of the present specification, the description with reference to the terms "one embodiment," "some embodiments," "example," "specific example," or "some examples," and the like means a specific feature described in connection with a structure, material or feature included in at least one embodiment or example of the disclosure. In the present specification, the schematic representation of the above terms is not necessarily directed to the same embodiment or example. Furthermore, the particular features, structures, materials, or characteristics described may be combined in a suitable manner in any one or more embodiments or examples. In addition, various embodiments or examples described in the specification, as well as features of various embodiments or examples, may be combined by those skilled in the field if no contradictions occur.

Hereinafter, a pressure detecting circuit and a pressure detecting method, a display panel, and a display apparatus according to embodiments of the present disclosure will be described with reference to the drawings.

Figure 2:
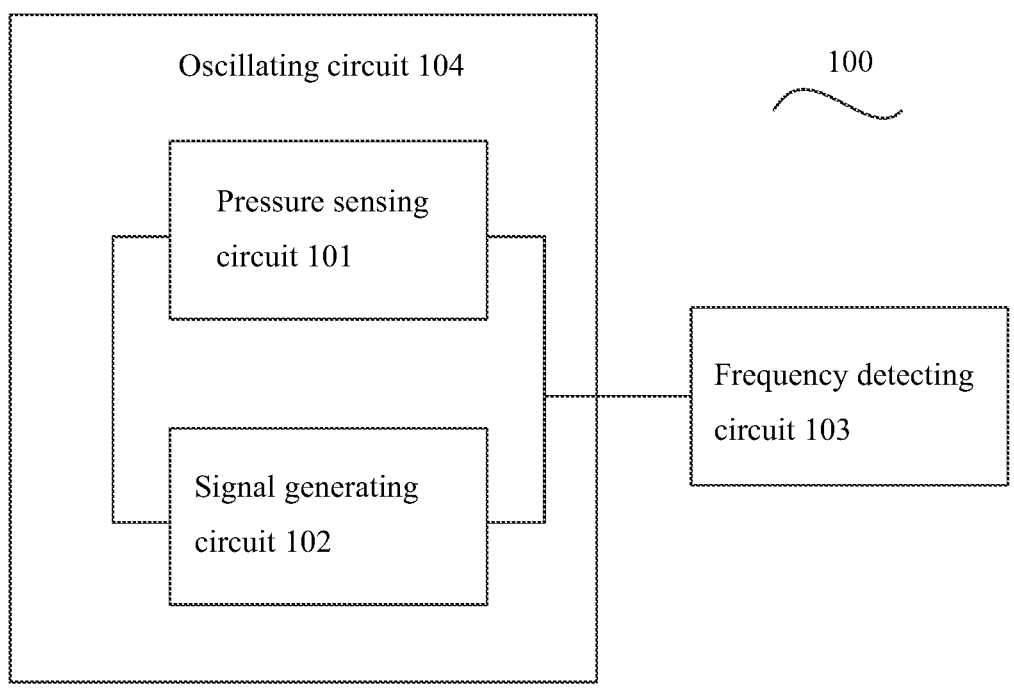
FIG. 2 is a schematic block diagram of a pressure sensing circuit according to an embodiment of the present disclosure.

FIG. 2 is a schematic block diagram of a pressure detecting circuit according to an embodiment of the present disclosure. The pressure detecting circuit can be integrated on the display panel. As shown in FIG. 2, the pressure detecting circuit 100 includes a pressure sensing circuit 101, a signal generating circuit 102, and a frequency detecting circuit 103.

The signal generating circuit 102 and the pressure sensing circuit 101 are configured to constitute an oscillating circuit 104. The signal generating circuit 102 generates an oscillating signal based on the pressure sensed by the pressure sensing circuit 101 when the oscillating circuit 104 is operational. The frequency of the oscillating signal and the pressure sensed by the circuit 101 are related to each other. The frequency detecting circuit 103 is coupled to the signal generating circuit 102. The frequency detecting circuit 103 is used for detecting the frequency of the oscillating signal and determining the pressure sensed by the pressure sensing circuit 101 based on the frequency of the oscillating signal.

In other words, the oscillating circuit 104 can generate a waveform having a characteristic frequency, i.e., an oscillating signal, the frequency of which relates to the pressure sensed by the pressure sensing circuit 101. Therefore, when the pressure sensed by the pressure sensing circuit 101 changes, the frequency of the oscillating signal also changes accordingly. Further, the frequency detecting circuit 103 can determine the pressure sensed by the pressure sensing circuit 101 by measuring the frequency of the oscillating signal, thereby realizing pressure sensing.

Therefore, the pressure detecting circuit in the embodiment of the present disclosure uses the frequency as the detection index, and can obtain the pressure through the measurement of the frequency. As such, the anti-noise ability can be improved, the power consumption can be effectively reduced, and the detection error can also be reduced.

Figure 3:
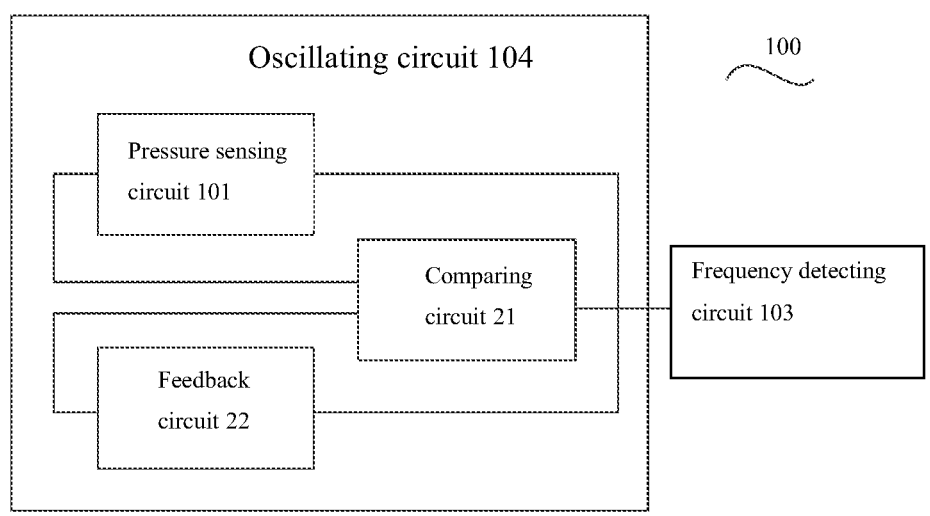
FIG. 3 is a schematic block diagram of a pressure detecting circuit according to one embodiment of the present disclosure.

According to one embodiment of the present disclosure, as shown in FIG. 3, the signal generating circuit 102 includes a comparing circuit 21 and a feedback circuit 22. The first input terminal of the comparing circuit 21 is coupled to the first terminal of the pressure sensing circuit 101. The output terminal of the comparing circuit 21 is coupled to the second terminal of the pressure sensing circuit 101. The first terminal of the feedback circuit 22 is coupled to the second input terminal of the comparison circuit 21, and the second terminal of the feedback circuit 22 is coupled to the output terminal of the comparing circuit 21. The comparing circuit 21 generates an oscillating signal by comparing the voltage at the first terminal of the pressure sensing circuit 101 with the voltage at the first terminal of the feedback circuit 22, and outputs the oscillating signal through the output terminal of the comparing circuit 21.

It can be understood that the first input terminal of the comparing circuit 21 may be one of a positive input terminal and a negative input terminal, and the second input terminal of the comparing circuit 21 may be the other one of the positive input terminal and the negative input terminal. That is, the pressure sensing circuit 101 and the feedback circuit 22 may be coupled to the positive input terminal and the negative input terminal of the comparing circuit 21, but it does not limit which circuit is coupled to which terminal of the comparing circuit 21 as long as the oscillating circuit 104 can achieve oscillation. For convenience of description, in the following embodiments, the pressure sensing circuit 101 is coupled to the negative input terminal of the comparing circuit 21, and the feedback circuit 22 is coupled to the positive input terminal of the comparing circuit 21 as an example.

It should be noted that, the pressure sensing circuit 101 can charge or discharge based on the voltage of the output terminal of the comparing circuit 21. In one embodiment, when the voltage of the output terminal of the comparing circuit 21 is the first voltage, for example, a positive voltage, the pressure sensing circuit 10 charges. When the voltage at the output terminal of the comparing circuit 21 is the second voltage, for example, a negative voltage, the pressure sensing circuit 101 discharges. The charging time and discharging time of the pressure sensing circuit 101 are related to the pressure sensed by the pressure sensing circuit 101.

In one embodiment, the pressure sensing circuit 101 may perform charging and discharging based on the voltage at the output terminal of the comparing circuit 21 and the pressure sensed to generate an induced voltage value. The induced voltage value is input to the negative input terminal of the comparing circuit 21. The feedback circuit 22 may generates a feedback voltage value based on the voltage at the output terminal of the comparing circuit 21, which can be input to the positive input terminal of the comparing circuit 21. Based on the operating principle of the comparing circuit 21, when the voltage at the output terminal of the comparing circuit 21 is a positive voltage, the pressure sensing circuit 101 is charging. As such, the induced voltage value gradually increases. The feedback voltage value is another positive voltage that is proportional to the positive output voltage at the output terminal of the comparing circuit 21. When the induced voltage value exceeds the feedback voltage value, the voltage at the output terminal of the comparing circuit 21 becomes a negative voltage. When the voltage at the output terminal of the comparing circuit 21 is a negative voltage, the pressure sensing circuit 101 is discharging. As such, the induced voltage value gradually decreases, and the feedback voltage value is another negative voltage which is proportional to the negative voltage output at the output terminal of the comparing circuit 21. When the induced voltage value falls below the feedback voltage value, the voltage at the output terminal of the comparing circuit 21 becomes a positive voltage again. In this way, continuous oscillation occurs through charging and discharging of the pressure sensing circuit 101 to form a waveform having a characteristic frequency such as a square wave.

Therefore, when the pressure sensed by the pressure sensing circuit 101 changes, the charging time and discharging time of the pressure sensing circuit 101 changes, which in turn affects the frequency of the oscillating signal. Therefore, the pressure sensed by the pressure sensing circuit 101 can be detected by measuring the frequency of the oscillating signal.

Figure 4:
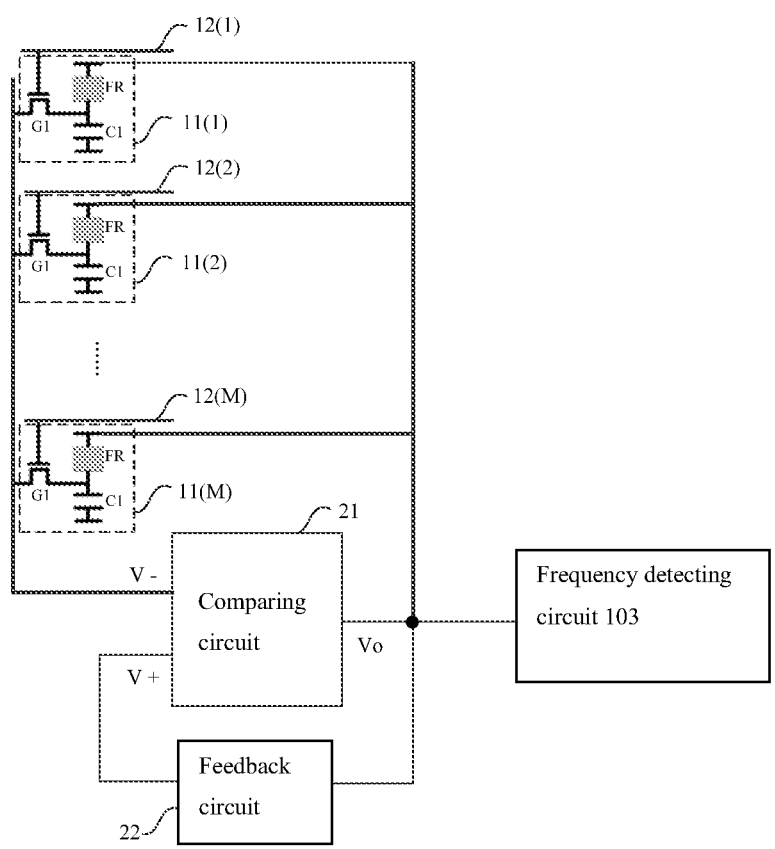
FIG. 4 is a schematic block diagram of a pressure detecting circuit according to one embodiment of the present disclosure.

According to one embodiment of the present disclosure, as shown in FIG. 4, the pressure sensing circuit 101 includes M pressure sensing subcircuits 11, the first terminal of each pressure sensing subcircuit 11 is coupled to the first input terminal of the comparing circuit 21, and the second terminal of each pressure sensing subcircuit 11 is coupled to the output terminal of the comparing circuit 21. Each pressure sensing subcircuit 11 includes a pressure sensitive component FR, a first transistor G1, and a first capacitor C1. Each pressure sensing subcircuit 11 participates in the oscillation of the oscillating circuit 104 when the corresponding first transistor G1 is turned on. M is a positive integer.

In one embodiment, the pressure sensitive component FR is disposed on the display panel. In other words, the pressure sensitive components FR are integrated on the display panel. The pressure sensitive component FR may be a pressure sensitive resistor, such as a piezoelectric varistor or piezoelectric film varistor.

In one embodiment, as shown in FIG. 4, the pressure detecting circuit includes M scanning signal lines 12. The gates of the first transistors G1 of the M pressure sensing subcircuits 11 are coupled to the M scanning signal lines 12 respectively. Each scanning signal line 12 controls whether the corresponding pressure sensing subcircuit 11 participates in oscillation or not by controlling the opening and closing of the corresponding first transistor G1.

That is, the gate of the first transistor G1 of the first pressure sensing subcircuit 11(1) is coupled to the first scanning signal line 12(1), and the gate of the first transistor G1 of the second pressure sensing subcircuit 11(2) is coupled to the second scanning signal line 12(2). Likewise, the gate of the first transistor G1 of the Mth pressure sensing subcircuit 11(M) is coupled to the Mth scanning signal line 12(M). Each pressure sensing subcircuit 11 can be turned on according to the scan signal provided by the scan signal line 12. For example, when the first transistor G1 in the first pressure sensing subcircuit 11(1) is turned on under the control of the scan signal provided by the first scan signal line 12(1), the first pressure sensing subcircuit 11(1) participates in oscillation.

In one embodiment, the pressure sensed by each of the M pressure sensing subcircuits 11 may be sequentially determined by controlling turning on the M pressure sensing subcircuits 11 one by one. For example, when the first transistor G1 in the first pressure sensing subcircuit 11(1) is turned on and the first transistors G1 in other pressure sensing subcircuits 11 are turned off, the pressure sensitive component FR and the first capacitor C1 in the first pressure sensing subcircuit 11(1) may form an negative feedback network in the oscillating circuit 104. Meanwhile, the feedback circuit 22 serves as a positive feedback network of the oscillating circuit 104. Thus, under the combined action of the positive feedback and negative feedback networks of the entire pressure detecting circuit 100, the comparing circuit 21 generates a waveform having a characteristic frequency, that is, an oscillating signal. The frequency of the oscillating signal is determined by the positive feedback network and the negative feedback network. Therefore, when the pressure sensed by the first pressure sensing subcircuit 11(1) changes, the resistance of the pressure sensitive component FR changes, and the frequency of the oscillating signal also changes along with it. As such, by measuring the frequency of the oscillating signal, the resistance of the pressure sensitive component FR can be obtained, and the pressure sensed by the first pressure sensing subcircuit 11(1) can be determined, thereby achieving pressure sensing.

Therefore, the pressure detecting circuit 100 of the embodiment of the present disclosure uses the frequency as a detection index, thereby improving the anti-noise capability. Furthermore, there is high input impedance during frequency detection, which can effectively reduce power consumption as well as detection errors. In addition, the pressure detecting circuit 100 can generate an oscillating signal by self-oscillation, and does not require external excitation.

The circuit structure of the pressure sensing subcircuit 11 and the signal generating circuit 102 are described in detail with reference to FIGS. 5-8.

Figure 5:
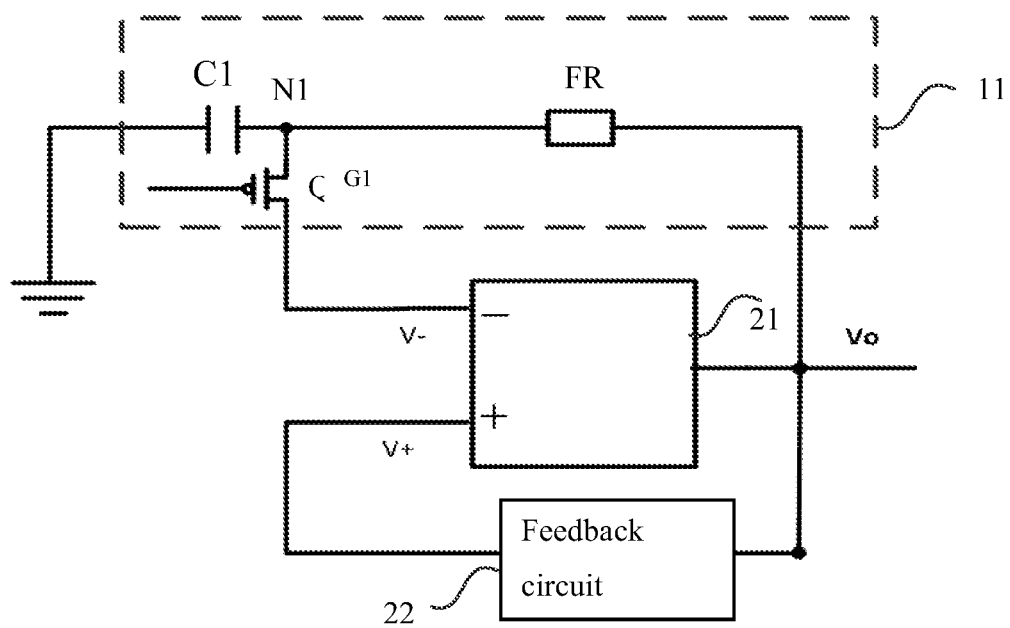
FIG. 5 is a schematic diagram of a pressure detecting circuit according to an embodiment of the present disclosure.

According to one embodiment of the present disclosure, as shown in FIG. 5, one terminal of the first capacitor C1 is grounded, and the other terminal of the first capacitor C1 is coupled to one terminal of the pressure sensitive component FR. Between the first capacitor C1 and the pressure sensitive component FR is the first node N1. The other terminal of the pressure sensitive component FR is coupled with the output terminal Vo of the comparing circuit 21. The first node N1 is coupled with the first terminal of the first transistor G1, and the second terminal of the first transistor G1 is coupled to the first input terminal of the comparing circuit 21, for example, the negative input V−. Among them, the comparing circuit 21 may be a comparator or an operational amplifier.

Figure 6:
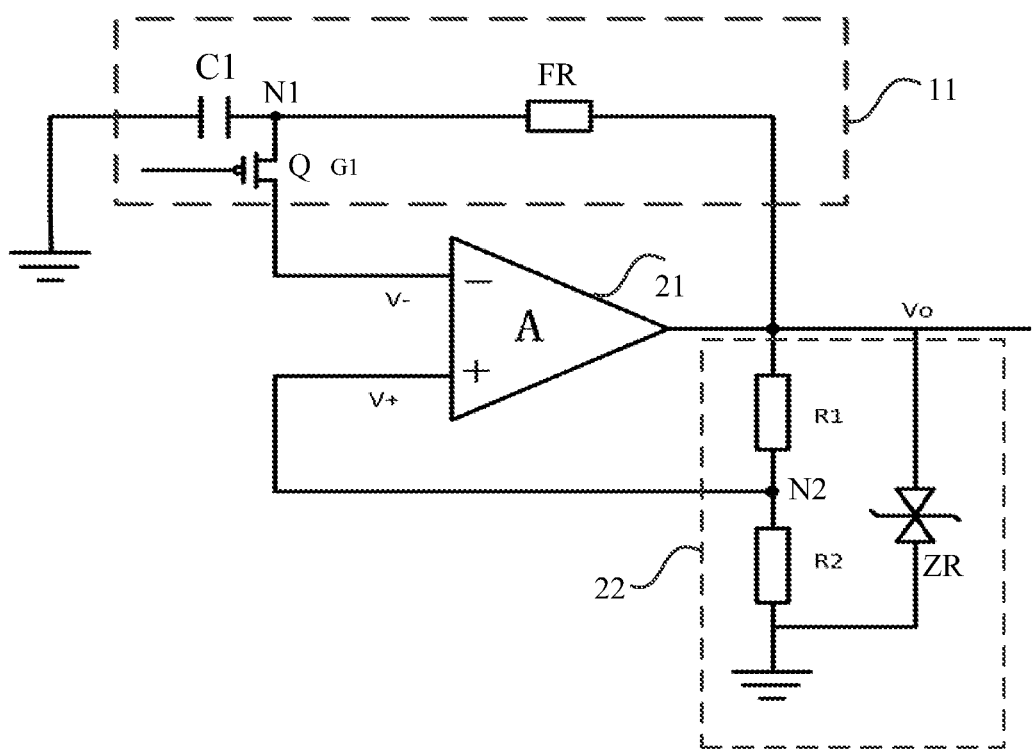
FIG. 6 is a schematic diagram of a pressure detecting circuit according to one embodiment of the present disclosure.

According to one embodiment of the present disclosure, as shown in FIG. 6, the feedback circuit 22 includes a first resistor R1 and a second resistor R2. One terminal of the first resistor R1 is coupled to the output terminal Vo of the comparing circuit 21, and the other terminal of the first resistor R1 is coupled to one terminal of the second resistor R2. The first resistor R1 and the second resistor R2 have a second node N2 between them. The other terminal of the second resistor R2 is grounded. The second node N2 is coupled to the second input terminal of the comparing circuit 21, for example, the positive input terminal V+.

Further, in one embodiment, as shown in FIG. 6, the signal generating circuit 102 further includes a Zener diode ZR. One terminal of the Zener diode ZR is coupled to the output terminal Vo of the comparing circuit 21, and the other terminal of the Zener diode ZR is grounded.

In one embodiment, as shown in FIGS. 5 and 6, the pressure sensitive component FR, the first transistor G1, and the first capacitor C1 are integrated on the display panel, and configured as the pressure sensing subcircuit 11 of the entire pressure detecting circuit 100. The second terminal of the pressure sensing subcircuit 11 is coupled to the output terminal Vo of the comparing circuit 21, and the first terminal of the pressure sensing subcircuit 11 is coupled to the negative input terminal V− of the comparing circuit 21. At the same time, the output terminal Vo of the comparing circuit 21 is fed back to the positive input terminal V+ of the comparing circuit 21 via the first resistor R1 and the second resistor R2. The first resistor R1 and the second resistor R2 are configured as the feedback circuit 22 of the entire pressure detecting circuit 100. Thus, the pressure sensing subcircuit 11 acts as a negative feedback network of the oscillating circuit 104, and the feedback circuit 22 acts as a positive feedback network of the oscillating circuit 104. Under the combined action of the negative feedback and positive feedback networks, the output terminal Vo of the comparing circuit 21 can generate a square wave, i.e., the oscillating signal.

Moreover, in one embodiment, by setting the Zener diode ZR at the output terminal Vo of the comparing circuit 21, voltage clamping can be achieved. As such, the voltage of the output terminal Vo of the comparing circuit 21 can be limited to a preset voltage or less, thereby preventing the apparatus from being damaged due to the overly large voltage of the output terminal Vo and effectively protecting the apparatus.

Figure 7:
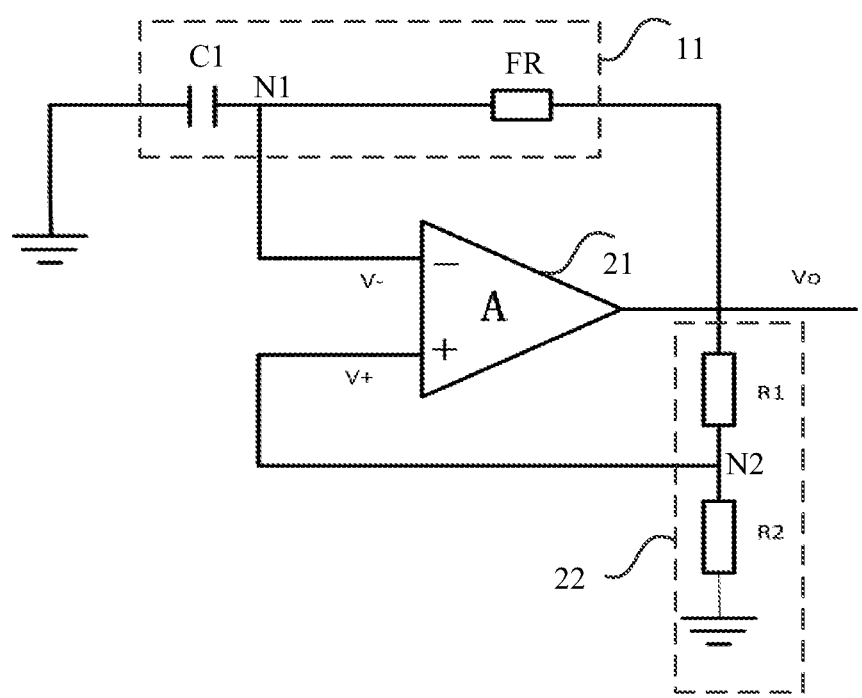
FIG. 7 is a schematic equivalent diagram of a pressure detecting circuit according to one embodiment of the present disclosure.
Figure 8:
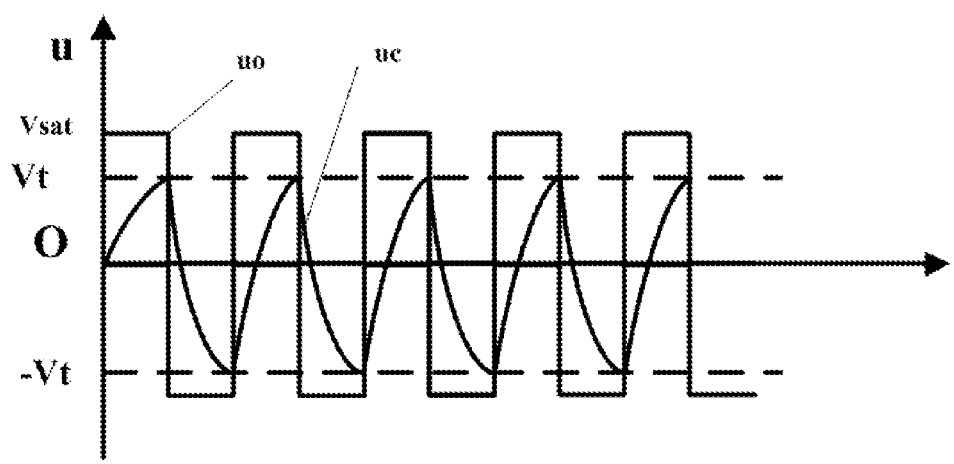
FIG. 8 is a schematic diagram of an operational principle of a pressure detecting circuit according to one embodiment of the present disclosure.

Without being held to a particular theory, as shown in FIGS. 7 and 8, the oscillation principle of the pressure detecting circuit 100 is as follows:

Taking a pressure sensing subcircuit 11 as an example, when the first transistor G1 in the pressure sensing subcircuit 11 is turned on, the embodiment of FIG. 6 can be equivalent to FIG. 7, wherein the comparing circuit 21 includes an operational amplifier A. As shown in FIG. 7, the operational amplifier A and the first resistor R1 and the second resistor R2 form a Schmitt trigger whose threshold is Vt=Vsat*R1/(R1+R2), wherein Vsat is the voltage at the output Vo of the operation amplifier A.

In one embodiment, FIG. 8 shows a voltage waveform uo of the output terminal Vo of the operational amplifier A and a voltage waveform uc of the first capacitor C1. When the pressure detecting circuit 100 operates, the operational amplifier A is open-loop. When the voltage of the output terminal Vo of the operational amplifier A is a positive voltage Vsat, the pressure sensitive component FR and the first capacitor C1 are coupled in series to charge the first capacitor C1, and the potential of the first capacitor C1 is input to the negative input terminal V− of the operational amplifier A. That is, the potential of the negative input terminal V− is equal to the potential of the first capacitor C1. At the same time, the first resistor R1 and the second resistor R2 divide the voltage of the output terminal Vo of the operational amplifier A, and the divided voltage Vt is supplied to the positive input terminal V+ of the operational amplifier A. Therefore, when the voltage on the first capacitor C1 rises to Vt, since the positive input terminal is Vt, the potential of the negative input terminal V− is higher than the potential of the positive input terminal V+ at the next moment. Then, the voltage of the output terminal Vo of the operational amplifier A becomes a negative voltage −Vsat.

When the voltage of the output terminal Vo of the operational amplifier A is a negative voltage −Vsat, the voltage of the output terminal Vo of the operational amplifier A becomes a negative value. As such, the first capacitor C1 and the pressure sensitive component FR discharge. The divided voltage by the first resistor R1 and the second resistor R2 becomes −Vt, that is, −Vt is supplied to the positive input V+ of the operational amplifier A. Thus, when the voltage on the first capacitor C1 drops to −Vt, since the positive input is −Vt, at the next moment, the potential of the negative input V− is lower than the potential of the positive input V+. Then, the voltage at the output Vo of the operational amplifier A becomes a positive voltage Vsat. As such, it continues to oscillate, thereby forming a square wave.

Based on the above analysis, the charging and discharging times of the first capacitor C1 and the pressure sensitive component FR affect frequency of the square wave. In other words, when the resistance of the pressure sensitive component FR changes, the time constant of the RC (R, C represents resistance and capacitance, respectively) circuit constituted by the first capacitor C1 and the pressure sensitive component FR changes, thereby causing a change in the charging time and the discharging times and accordingly affecting the frequency of the square wave. After calculation, the frequency of the square wave $f=1/(2*Rfr*C*\ln(1+2R1/R2))$, where Rfr is the resistance value of the pressure sensitive component FR, C is the capacitance of the first capacitor C1, and R1 is the resistance of the first resistor R1, and R2 is the resistance of the second resistor R2. Therefore, the resistance value Rfr of the pressure sensitive component FR can be obtained by measuring the frequency of the square wave, thereby determining the pressure sensed by the pressure sensitive component FR.

According to some embodiments of the present disclosure, the M pressure sensing subcircuits 11 are in a same column, and the first transistors G1 of the M pressure sensing subcircuits 11 are turned on line by line. It can be understood that the display panel may include N pressure sensing circuits 101 according to the some embodiments of the present disclosure. Since each of the pressure sensing circuits 101 includes M pressure sensing subcircuits 11, an M row and N columns of pressure sensing array may be formed. The M pressure sensing subcircuits 11 of a pressure sensing circuit 101 can be used as a column of the pressure sensing array. When the pressure sensing array is used to detect the pressure, the sensing can be performed line by line. That is, the first transistors G1 of the N pressure sensing subcircuits 11 in the same row are simultaneously turned on, and the first transistors G1 in the M pressure sensing subcircuits 11 in the same column are turned on line by line. When the first row is to be detected, the N first transistors G1 in the first row are simultaneously turned on, and the first transistors G1 in the other rows are turned off. That is, the first transistor G1 of only one pressure sensing subcircuit 11 in each column is turned on, and the first transistors G1 of M−1 pressure sensing subcircuits are turned off.

Figure 9:
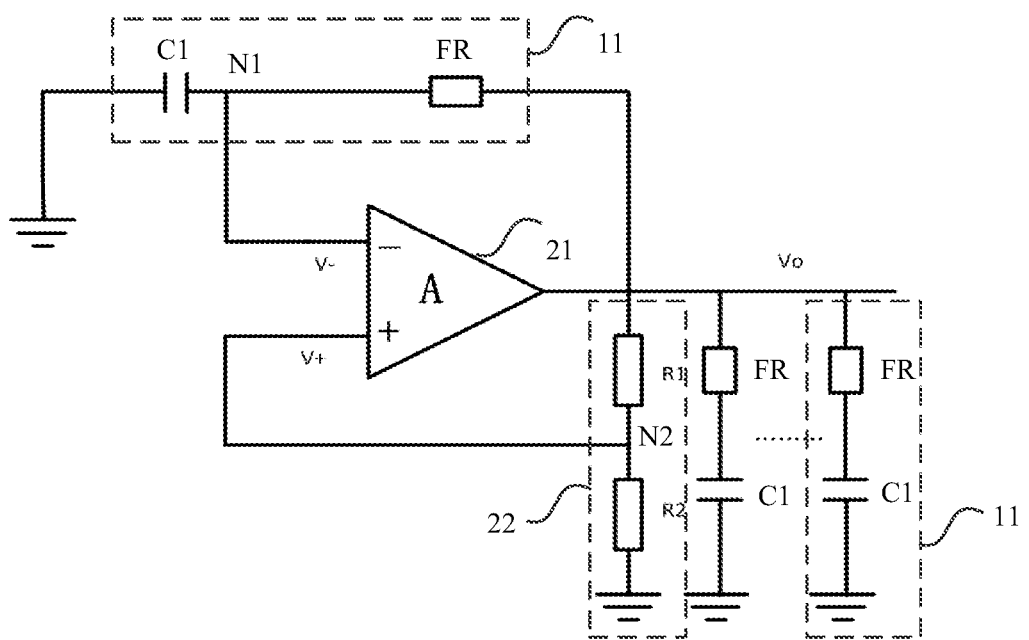
FIG. 9 is a schematic equivalent diagram of a pressure detecting circuit according to one embodiment of the present disclosure.

In one embodiment, the pressure sensing circuit has M pressure sensing subcircuits in the same column. The equivalent circuit of the M pressure sensing circuit can be as shown in FIG. 9. In one embodiment, assuming that the first transistor G1 of the first row is turned on, then the potential of the first capacitor C1 is input to the negative input terminal V− of the operational amplifier A. The first transistors G1 of the other M−1 pressure sensing subcircuits are in an off state, and appear as negative loads of the pressure detecting circuit 100. As such, the first transistors G1 of the other M−1 pressure sensing subcircuits do not affect the output waveform of the comparing circuit 21. Thus, when the first transistor G1 of any row is turned on, the resistance value of the row of the pressure sensitive component FR can be determined by detecting the frequency of the oscillating signal output from the comparing circuit 21, thereby determining the pressure sensed by the pressure sensitive component FR.

It can be understood that the oscillating signal outputted by the comparing circuit 21 relates to the change of the resistance value of the pressure sensitive component FR. Specifically, the change of the resistance value of the pressure sensitive component FR is reflected in the frequency change of the oscillating signal, and therefore the frequency of the oscillating signal needs to be detected. The frequency detection mode of the frequency detecting circuit 103 is described below with reference to FIGS. 10 and 11.

Figure 10:
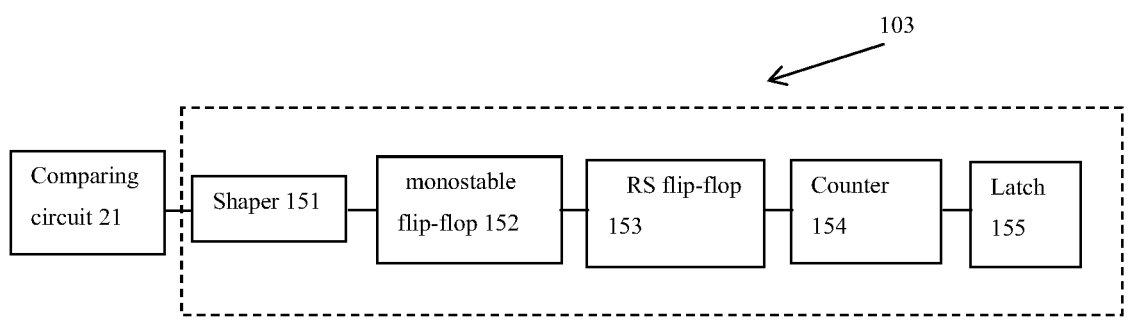
FIG. 10 is a schematic block diagram of a frequency detecting circuit in a pressure detecting circuit according to one embodiment of the present disclosure.

As shown in FIG. 10, the frequency detecting circuit 103 includes a shaper 151, a monostable flip-flop 152, an RS flip-flop 153, a counter 154, and a latch 155.

In one embodiment, an input terminal of the shaper 151 is coupled to the output terminal Vo of the comparing circuit 21, and the shaper 151 is configured to shape the oscillating signal to generate and output an shaped oscillating signal. The input terminal of the monostable flip-flop 152 is coupled to the output terminal of the shaper 151, and the monostable flip-flop 152 is used for generating a pulse signal based on the shaped oscillating signal. The input terminal of the RS flip-flop 153 is coupled to the output terminal of the monostable flip-flop 152, and the RS flip-flop 153 is used for generating a trigger signal based on the pulse signal. The input terminal of the counter 154 is coupled to the output terminal of the RS flip-flop 153, and the counter 154 is configured to count under the control of the trigger signal to record the number of count pulses between adjacent two pulse signals. The input terminal of the latch 155 is coupled to the output terminal of the counter 154, and the latch 155 is used for latching the number of count pulses between the adjacent two pulse signals.

It can be understood that the shaper can be used to increase the quality of the waveform of the oscillating signal and eliminate minute burrs. The monostable flip-flop 152 can be used to generate a pulse of a preset width. That is, the shaped oscillating signal is formed into a pulse output having a fixed width. As such, after being processed by the monostable flip-flop 152, an output of a regular waveform with a fixed width, a fixed amplitude, and steep rising and falling edges is obtained.

In one embodiment, the output terminal of the monostable flip-flop 152 can be coupled to the S terminal of the RS flip-flop 153. The S terminal is also referred to as the 1 terminal or the set terminal. The S terminal of the RS flip-flop 153 can be inverted with the R terminal of the RS flip-flop 153. The R terminal is also referred to as the 0 terminal or the reset terminal. That is, when the R terminal is set to 1, the S terminal is set to 0, and the output terminal of the RS flip-flop 153 is set to 1. When the R terminal is set to 0, the S terminal is set to 1, and the output terminal of the RS flip-flop 153 is set to 0 at this time. In other words, the RS flip-flop 153 is originally in the 1 state. To make it into the 0 state, the level of the R terminal must be changed from 1 to 0, and the level of the S terminal is changed from 0 to 1. Here 1 represents a high level and 0 represents a low level.

In one embodiment, the output terminal of RS flip flop 153 is coupled to counter 154 via AND gate 156. The output terminal of RS flip flop 153 is coupled to a first input terminal of the AND gate 156, and the second input terminal of AND gate 156 is for receiving a count pulse such as a clock pulse CP, and the output terminal of AND gate 156 is coupled to the input terminal of counter 154. The trigger signal generated by RS flip-flop 153 based on the pulse signal is provided to the first input terminal of AND gate 156, and the second input terminal of AND gate 156 receives the clock pulse. The trigger signal output from the RS flip-flop 153 in conjunction with the count pulse such as the clock pulse CP is output to the counter 154 through the AND gate 156.

That is to say, the oscillating signal is first shaped by the shaper 151, and the shaping by the shaper can make the oscillating signal waveform quality higher and eliminate the slight burrs. Then, the shaped oscillating signal such as the square wave signal sequentially pass through the monostable flip-flop 152, the RS flip-flop 153, the counter 154, and the latch 155, thereby obtaining one cycle time of the oscillation signal as well as the frequency of the oscillating signal.

Figure 11:
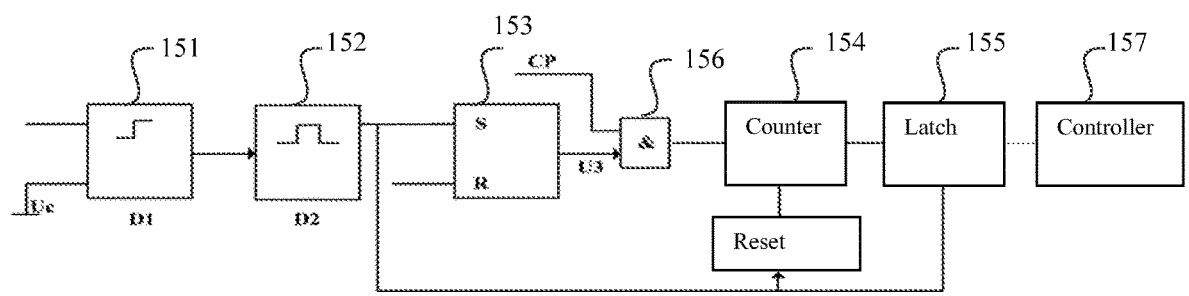
FIG. 11 is a schematic block diagram of operational principle of a frequency detecting circuit in a pressure detecting circuit according to one embodiment of the present disclosure.

In one embodiment, as shown in FIG. 11, the shaper 151 may be a numerical comparator. The shaper 151 may shape the oscillating signal into a square wave signal, thereby increasing the quality of the oscillating signal waveform and eliminating minute burrs. The monostable flip-flop 152 may be a monostable circuit capable of converting a square wave signal into a pulse signal such as a narrow pulse signal. The width of the narrow pulse signal is much smaller than the width of the square wave signal. Each period of the square wave corresponds to a pulse signal. The falling edge of the pulse signal is used to control the output of the RS flip-flop 153 to be at a high level. That is, the R terminal is set to 1, the S terminal is set to 0, and the output terminal of the RS flip-flop 153 is set to 1. The rising edge of the pulse signal is used to control the output of the RS flip-flop 153 to be at a low level. That is, the R terminal is set to 0, the S terminal is set to 1, and the output terminal of the RS flip-flop 153 is set to 0.

The output of the RS flip-flop 153 is combined with a count pulse such as a clock pulse CP through an AND gate 156 and then output to the counter 154. The frequency of the clock pulse CP is much larger than the frequency of the pulse signal. When the output of the RS flip-flop 153 is at a high level, the clock pulse CP can be output to the counter 154 through the AND gate 156, and the counter 154 counts the clock pulse CP. When the rising edge of the next pulse arrives, that is, after an end of a period of the square wave, the output of the RS flip-flop 153 becomes a low level, the output of the gate 156 is at a low level, the output of the clock pulse CP is stopped, the counter 154 stops counting, and the latch 155 latches the count value. At this time, the count value of the latch is the number of count pulses between adjacent two pulse signals.

The count value latched by the latch 155 can be read by the controller 157. Since the frequency of the clock pulse CP is known, the period of the oscillating signal can be calculated based on the count value latched by the latch 155, i.e., the number of count pulses between adjacent two pulse signals. As such, the frequency of the oscillating signal is obtained.

In summary, according to the pressure detecting circuit of the embodiment of the present disclosure, the signal generating circuit and the pressure sensing circuit are configured as an oscillating circuit, and the signal generating circuit generates an oscillating signal based on the pressure sensed by the pressure sensing circuit when the oscillating circuit is in operation. The frequency of the oscillating signal is related to the pressure sensed by the pressure sensing circuit. The frequency detecting circuit detects the frequency of the oscillating signal, and determines the pressure sensed by the pressure sensing circuit based on the frequency of the oscillating signal. Therefore, the pressure detecting circuit of the embodiments of the present disclosure uses the frequency as a detection index, and can obtain the pressure by measuring the frequency, thereby improving the noise resistance and effectively reducing the power consumption as well as the detection error.

Figure 12:
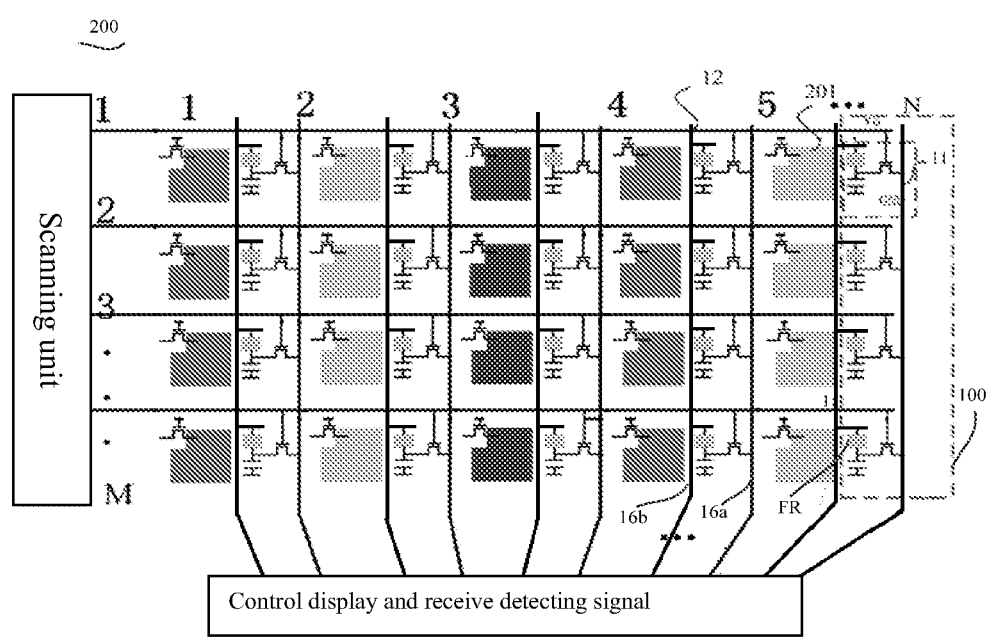
FIG. 12 is a schematic diagram of a display panel according to one embodiment of the present disclosure.

Based on the above embodiments, the present disclosure also provides a display panel. As shown in FIG. 12, the display panel 200 includes N pressure detecting circuits 100 of the foregoing embodiments, and N is a positive integer.

Further, as shown in FIG. 12, each of the pressure sensing circuits includes M pressure sensing subcircuits 11. As such, an M row and N column array of pressure sensing subcircuits is formed. The gates of the first transistors G1 of the N pressure sensing subcircuits 11 of the same row are coupled to the same scanning signal line so that the first transistors G1 of the N pressure sensing subcircuits 11 are simultaneously turned on. The first transistors G1 of the M rows of pressure sensing subcircuits 11 are turned on row by row.

According to one embodiment of the present disclosure, the pressure sensing subcircuit 11 may be respectively disposed in intervals between pixels in the display area of the display panel. For example, in the embodiment of FIG. 12, the pressure sensing subcircuits 11 are disposed in the intervals between pixels in the display area of the display panel. In one embodiment, as shown in FIG. 12, the M pressure sensing subcircuits 11 of the pressure sensing circuit may be in the same column. The first transistors G1 of the M pressure sensing subcircuits 11 in the same column are turned on row by row, and the first transistors G1 in the pressure sensing subcircuits 11 of the same row are simultaneously turned on.

In one embodiment, the display panel 200 further includes an array of M rows and N columns of pixel units 201, wherein the M×N pixel units 201 are disposed corresponding to the M×N pressure sensing subcircuits 11 respectively. Each pressure sensing subcircuit 11 is disposed in the interval between corresponding pixel units. More specifically, each column of pixel units 201 includes M pixel units 201, which are correspondingly arranged with M pressure sensing subcircuits 11 of respective columns.

In one embodiment, as shown in FIGS. 4 and 12, the display panel 200 may include an array of M rows and N columns of pixel units 201, an array of M row and N columns of pressure sensitive subcircuits, and an array of M rows and N columns of pressure sensitive components. The gates of the first transistors of the N pressure sensing subcircuits 11 of each row are coupled to the same scanning signal line 12. The second terminals of the M pressure sensing subcircuits 11 of each column are coupled to the same first output signal line 16a, and are coupled to the output terminal Vo of the same comparing circuit 21 through the same first output signal line 16a. The first terminals of the M pressure sensing subcircuits 11 of each column are coupled to the same second output signal line 16b, and are coupled to the first input terminal of the same comparing circuit 21 through the same second output signal line 16b.

In operation, the array of M rows and N columns of pressure sensitive components can be performed in a row-by-row manner. When the N pressure sensitive components FRs of a certain row are selected, the corresponding scan signal line of the certain row can output an On signal, so that the N first transistors G1, such as the thin film transistors TFT, of the certain row are turned on. The N pressure sensitive components FRs then are coupled to the output terminals Vo of the corresponding N comparing circuits 21 through the N first output signal lines 16a, and coupled to the first input terminals of the corresponding N comparing circuits 21 through the N second output signal lines 16b. As such, the resistance of the N pressure sensitive components in the row is correspondingly detected.

According to the display panel of the embodiment of the present disclosure, the frequency is used as the detection index by the pressure detecting circuit, so that the noise resistance can be improved, the power consumption can be effectively reduced, and the detection error can be reduced.

Based on the above embodiments, one embodiment of the present disclosure also provides a display apparatus including the display panel according to one embodiment of the present disclosure.

According to the display apparatus provided by the embodiment of the disclosure, the frequency can be used as the detection index by the display panel, thereby improving the anti-noise capability, effectively reducing the power consumption, and reducing the detection error.

Based on the above embodiments, one embodiment of the present disclosure also provides a detection method of a pressure detecting circuit.

Figure 13:
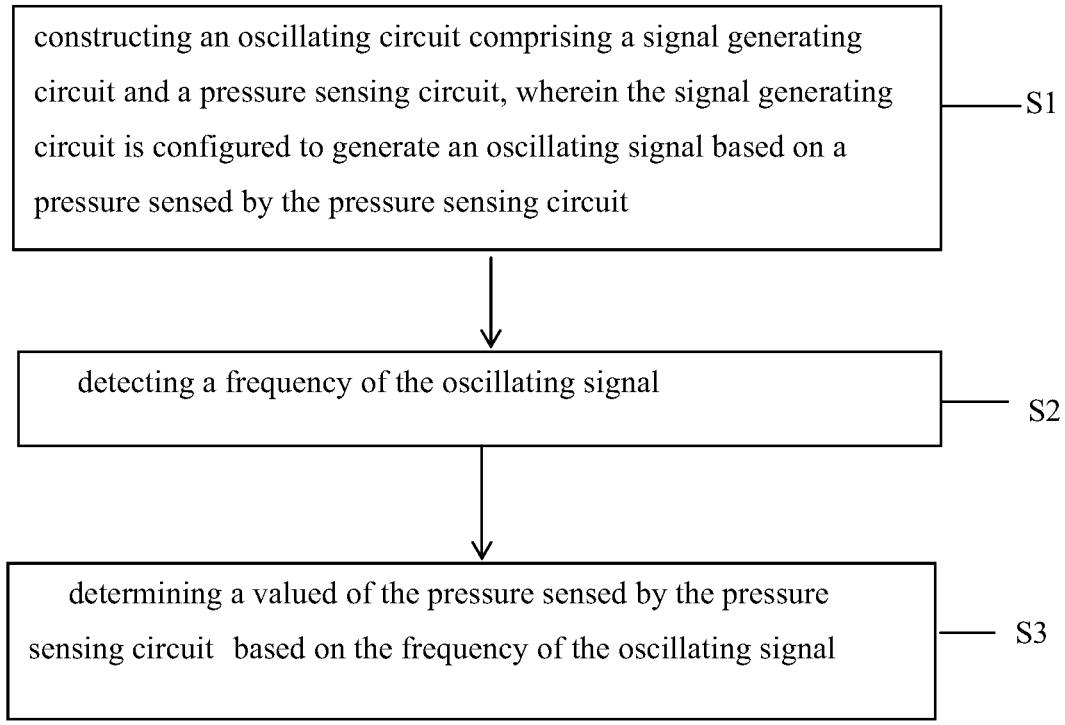
FIG. 13 is a flowchart of a detecting method of a pressure detecting apparatus according to one embodiment of the present disclosure.

FIG. 13 is a flowchart of a detection method of a pressure detecting circuit according to one embodiment of the present disclosure. As shown in FIG. 13, the detection method of the pressure detecting circuit includes the following steps:

In step S1, the signal generating circuit and the pressure sensing circuit constitute an oscillating circuit, and the signal generating circuit generates an oscillating signal based on the pressure sensed by the pressure sensing circuit when the oscillating circuit is in operation. The frequency of the oscillating signal is related to the pressure sensed by the pressure sensing circuit.

In step S2, the frequency of the oscillating signal is detected.

In step S3, the pressure sensed by the pressure sensing circuit is determined based on the frequency of the oscillating signal.

It should be noted that the foregoing explanation of the embodiments of the pressure detecting circuits is also applicable to the detection method of the pressure detecting circuit of the embodiment, and the details are not described herein again.

According to the detection method of the pressure detecting circuit of the embodiment of the present disclosure, the signal generating circuit and the pressure sensing circuit constitute an oscillating circuit. The signal generating circuit generates an oscillating signal based on the pressure sensed by the pressure sensing circuit when the oscillating circuit is in operation. The frequency of the oscillating signal is related to the pressure sensed by the pressure sensing circuit. As such, the frequency of the oscillating signal is detected, and the pressure sensed by the pressure sensing circuit is determined based on the frequency of the oscillating signal. Therefore, the detection method of the embodiment of the present disclosure uses the frequency as a detection index, and can obtain the pressure by measuring the frequency, thereby improving the anti-noise capability, effectively reducing the power consumption, and reducing the detection error.

The principles and the embodiments of the disclosure are set forth in the specification. The description of the embodiments of the present disclosure is only used to help one to understand the method of the present disclosure and the core idea thereof. Meanwhile, for a person of ordinary skill in the art, the disclosure relates to the scope of the disclosure, and the technical scheme is not limited to the specific combinations of the technical features, but should also cover other technical schemes which are formed by combining the technical features or the equivalent features of the technical features without departing from the inventive concept. For example, technical schemes may be obtained by replacing the features described above as disclosed in this disclosure (but not limited to) with similar features.

What is claimed is:

1. A pressure detecting circuit, comprising:
   a pressure sensing circuit;
   a signal generating circuit; and
   a frequency detecting circuit,
   wherein the pressure sensing circuit and the signal generating circuit are configured to constitute an oscillating circuit; the signal generating circuit is configured to generate an oscillating signal based on charging and discharging of the pressure sensing circuit; and the frequency detecting circuit is configured to detect a frequency of the oscillating signal and determine a pressure based on the frequency of the oscillating signal;
   wherein the signal generating circuit comprises:
   a comparing circuit, a first input terminal of the comparing circuit being coupled to a first terminal of the pressure sensing circuit, and an output terminal of the comparing circuit being coupled to a second terminal of the pressure sensing circuit; and
   a feedback circuit, a first terminal of the feedback circuit being coupled to a second input terminal of the comparison circuit, and a second terminal of the feedback circuit being coupled to the output terminal of the comparing circuit;

wherein the comparing circuit is configured to generate the oscillating signal by comparing a voltage of the first terminal of the pressure sensing circuit with a voltage of the first terminal of the feedback circuit, and outputs the oscillating signal through the output terminal of the comparing circuit; and wherein the pressure sensing circuit comprises:

M pressure sensing subcircuits, each of the M pressure sensing subcircuits comprising a pressure sensitive component, a first transistor, and a first capacitor, where M is a positive integer, wherein a first terminal of each of the M pressure sensing subcircuits is coupled to the first input terminal of the comparing circuit, a second terminal of each of the M pressure sensing subcircuits is coupled to the output terminal of the comparing circuit, and each of the M pressure sensing circuits is configured to participate in oscillation of the oscillating circuit when the corresponding first transistor is turned on.

2. The pressure detecting circuit according to claim 1, wherein the pressure detecting circuit comprises M scanning signal lines, and a gate of the first transistor of each of the M pressure sensing subcircuits is respectively coupled to one of the M scanning signal lines, and each of the scanning signal lines is configured to control whether a pressure sensing subcircuit participates in oscillation or not by controlling opening or closing of the first transistor of the pressure sensing subcircuit.

3. The pressure detecting circuit according to claim 1, wherein one terminal of the first capacitor is grounded, the other terminal of the first capacitor is coupled to one terminal of the pressure sensitive component, a first node is between the first capacitor and the pressure sensitive component, the other terminal of the pressure sensitive component is coupled to the output terminal of the comparing circuit, the first terminal of the first transistor is coupled to the first node, and the second terminal of the first transistor is coupled to the first input terminal of the comparing circuit.

4. The pressure detecting circuit according to claim 1, wherein the feedback circuit comprising a first resistor and a second resistor, and one terminal of the first resistor is coupled to the output terminal of the comparing circuit, the other terminal of the first resistor is coupled to one terminal of the second resistor, a second node is disposed between the first resistor and the second resistor and coupled to the second input terminal of the comparing circuit, and the other terminal of the second resistor is grounded.

5. The pressure detecting circuit according to claim 1, wherein the signal generating circuit further comprises a voltage stabilizing diode, one terminal of the voltage stabilizing diode is coupled to the output terminal of the comparing circuit and the other terminal of the voltage stabilizing diode is grounded.

6. The pressure detecting circuit according to claim 1, wherein the comparing circuit is a comparator or an operational amplifier.

7. The pressure detecting circuit according to claim 1, wherein the frequency detecting circuit comprises:
a shaper;
a monostable flip-flop;
an RS flip-flop;
a counter; and
a latch, wherein the shaper is configured to shape the oscillating signal to generate and output a shaped oscillating signal;

the monostable flip-flop is configured to convert the shaped oscillating signal to a pulse signal;

the RS flip-flop is configured to generate a trigger signal based on the pulse signal;

the counter is configured to count under control of the trigger signal to record a number of count pulses between two adjacent pulse signals; and the latch is configured to latch the number of count pulses between the two adjacent pulse signals.

8. The pressure detecting circuit according to claim 1, wherein the oscillating signal is a square wave signal.

9. The pressure detecting circuit according to claim 1, wherein the M pressure sensing subcircuits are in a same column.

10. The pressure detecting circuit according to claim 1, wherein the pressure sensitive component is a varistor.

11. A display panel, comprising N pressure detecting circuits according to claim 1, wherein N is a positive integer.

12. The display panel according to claim 11, wherein the display panel comprises a pressure sensing array comprising M rows and N columns of the pressure sensing subcircuits of the N pressure detecting circuits, wherein gates of first transistors of N pressure sensing subcircuits in a same row are coupled to a same scanning signal line, and the first transistors in the M rows of the pressure sensing subcircuits are turned on row by row.

13. The display panel according to claim 12, further comprising a pixel array comprising M rows and N columns of pixel units, wherein the M rows and N columns of pixel units are respectively disposed corresponding to the M rows and N columns of the pressure sensing subcircuits, and each of pressure sensing subcircuits is arranged in an interval between two of the pixel units.

14. A display apparatus comprising the display panel according to claim 11.

15. A pressure detecting method, comprising:
constructing an oscillating circuit comprising a signal generating circuit and a pressure sensing circuit, wherein the signal generating circuit is configured to generate an oscillating signal based on charging and discharging of the pressure sensing circuit;

detecting a frequency of the oscillating signal; and determining a pressure based on the frequency of the oscillating signal;

wherein the signal generating circuit comprises:

a comparing circuit, a first input terminal of the comparing circuit being coupled to a first terminal of the pressure sensing circuit, and an output terminal of the comparing circuit being coupled to a second terminal of the pressure sensing circuit; and a feedback circuit, a first terminal of the feedback circuit being coupled to a second input terminal of the comparison circuit, and a second terminal of the feedback circuit being coupled to the output terminal of the comparing circuit;

wherein the comparing circuit is configured to generate the oscillating signal by comparing a voltage of the first terminal of the pressure sensing circuit with a voltage of the first terminal of the feedback circuit, and outputs the oscillating signal through the output terminal of the comparing circuit; and wherein the pressure sensing circuit comprises:
M pressure sensing subcircuits, each of the M pressure sensing subcircuits comprising a pressure sensitive component, a first transistor, and a first capacitor, where M is a positive integer,
wherein a first terminal of each of the M pressure sensing subcircuits is coupled to the first input terminal of the comparing circuit, a second terminal of each of the M pressure sensing subcircuits is coupled to the output terminal of the comparing circuit, and each of the M pressure sensing circuits is configured to participate in oscillation of the oscillating circuit when the corresponding first transistor is turned on.

* * * * *